US010139688B2

(12) United States Patent
Hashiguchi et al.

(10) Patent No.: US 10,139,688 B2
(45) Date of Patent: Nov. 27, 2018

(54) LIQUID CRYSTAL DISPLAY PANEL AND LIQUID CRYSTAL DISPLAY INCLUDING LIQUID CRYSTAL DISPLAY PANEL

(71) Applicant: Mitsubishi Electric Corporation, Tokyo (JP)

(72) Inventors: Takafumi Hashiguchi, Tokyo (JP); Naruhito Hoka, Tokyo (JP); Naoya Hirata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 34 days.

(21) Appl. No.: 15/586,610

(22) Filed: May 4, 2017

(65) Prior Publication Data

US 2017/0351152 A1    Dec. 7, 2017

(30) Foreign Application Priority Data

Jun. 7, 2016    (JP) .................... 2016-113298

(51) Int. Cl.
*G02F 1/1345*   (2006.01)
*G02F 1/1343*   (2006.01)
*G02F 1/1362*   (2006.01)
*G02F 1/136*    (2006.01)

(52) U.S. Cl.
CPC ...... *G02F 1/1345* (2013.01); *G02F 1/134363* (2013.01); *G02F 1/136213* (2013.01); *G02F 2001/13606* (2013.01); *G02F 2001/134318* (2013.01)

(58) Field of Classification Search
CPC ..................................... G02F 1/1345
See application file for complete search history.

(56) References Cited

U.S. PATENT DOCUMENTS

| 6,707,522 | B2 | 3/2004 | Kim et al. |
| 8,023,088 | B2 | 9/2011 | Nakao |
| 2007/0035687 | A1* | 2/2007 | Oke ..................... G09G 3/3614 349/143 |
| 2008/0043196 | A1* | 2/2008 | Fujita .................... G02F 1/1345 349/152 |
| 2008/0062341 | A1* | 3/2008 | Tanaka .............. G02F 1/136213 349/38 |
| 2014/0125932 | A1* | 5/2014 | Kawakami ........ G02F 1/133553 349/110 |

FOREIGN PATENT DOCUMENTS

| JP | H01-293317 A | 11/1989 |
| JP | H09-005780 A | 1/1997 |
| JP | 2003-084303 A | 3/2003 |
| JP | 2006-276401 A | 10/2006 |
| JP | 2009-133954 A | 6/2009 |

* cited by examiner

*Primary Examiner* — Edmond Lau
(74) *Attorney, Agent, or Firm* — Studebaker & Brackett PC

(57) ABSTRACT

In an FFS liquid crystal display in which a dummy pixel in a dummy pixel region is smaller than a display pixel in a display region, a slit is formed in a common electrode in the display pixel while no slit is formed in the common electrode in the dummy pixel.

14 Claims, 10 Drawing Sheets

F I G. 6
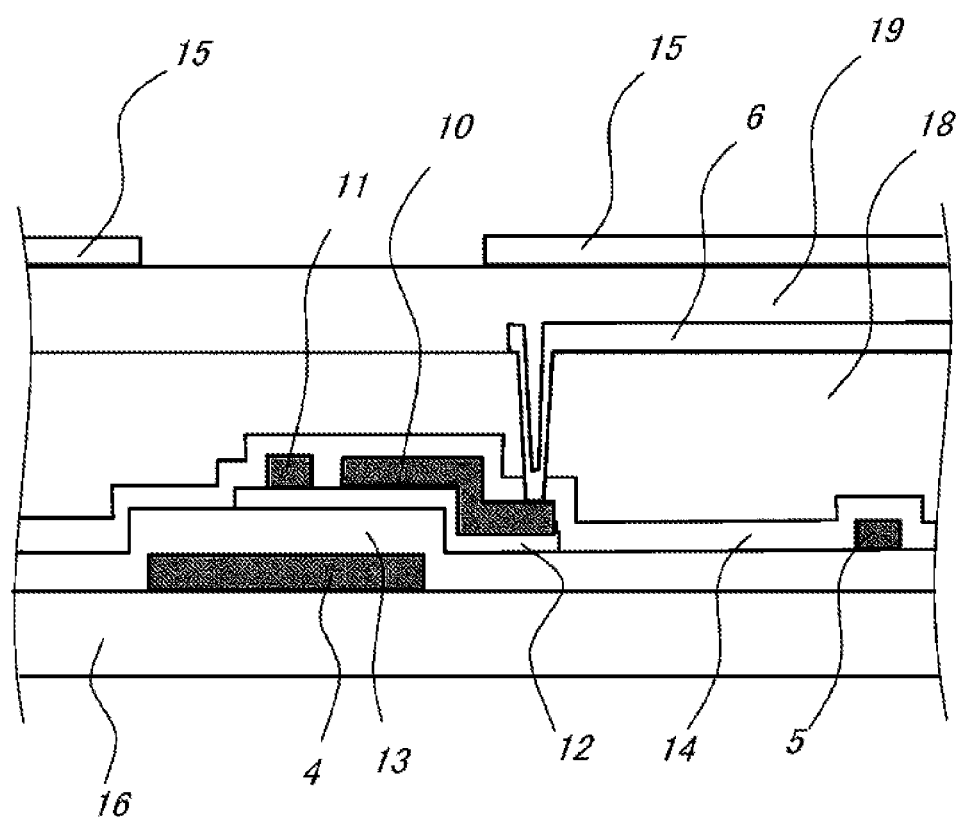

F I G. 8
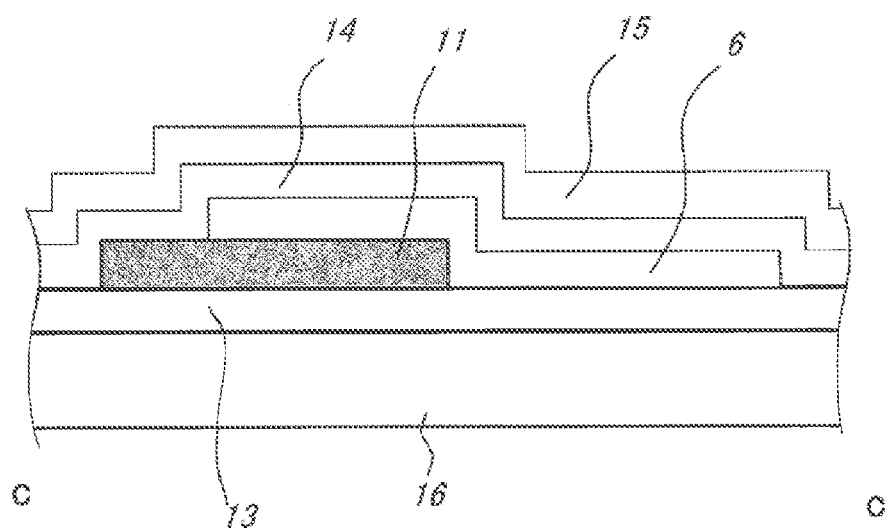

F I G. 9
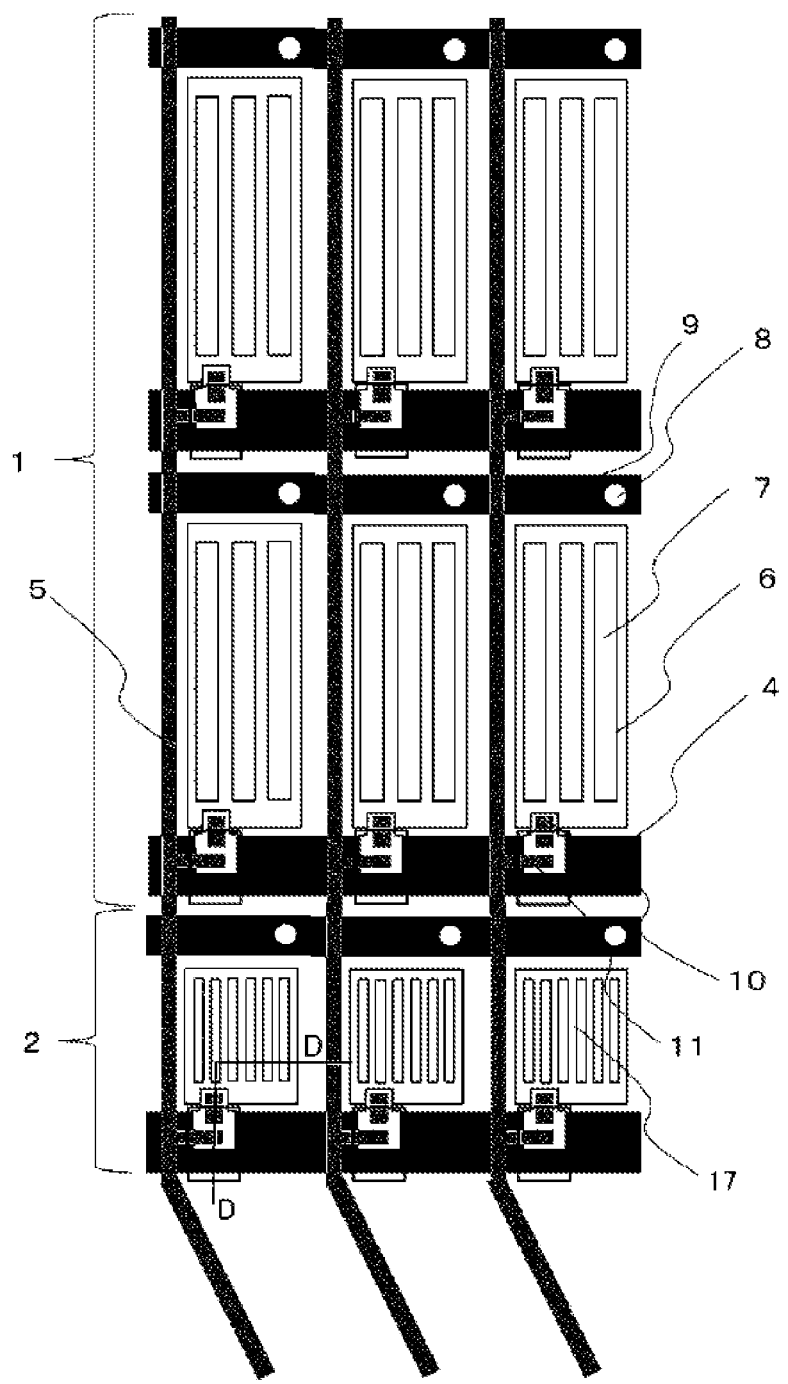

F I G. 1 0
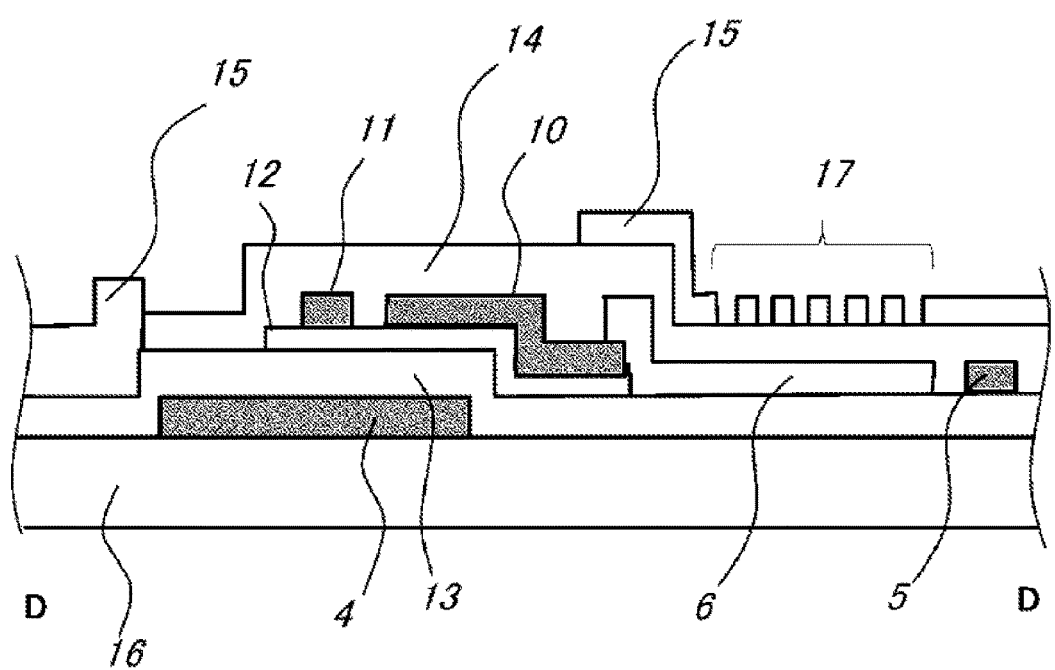

LIQUID CRYSTAL DISPLAY PANEL AND LIQUID CRYSTAL DISPLAY INCLUDING LIQUID CRYSTAL DISPLAY PANEL

BACKGROUND OF THE INVENTION

Field of the Invention

The present invention relates to a fringe field switching (FFS) liquid crystal display panel and a liquid crystal display that includes the liquid crystal display panel.

Description of the Background Art

In recent times, many new displays that include a thin and flat display panel using the principle of liquid crystals or electroluminescence instead of conventional cathode-ray tubes have been used. Liquid crystal displays typified by the new displays are not only thin and light but also capable of being driven at low voltage.

The liquid crystal display device includes two substrates with a liquid crystal layer sealed therebetween. One of the substrates is an array substrate in which a plurality of pixels arranged in matrix form a display region and the other of the substrates is a counter substrate. The counter substrate may be referred to as a color filter substrate particularly in a case in which a color filter is formed on the counter substrate.

A thin-film transistor (TFT) liquid crystal display particularly enables display of high image quality in which crosstalk is less likely to occur because each of pixels on the substrate includes a TFT serving as a switching element and is capable of independently maintaining a voltage for driving the liquid crystal layer. Each of the pixels includes gate lines (scan lines) for controlling ON and OFF of the TFT and source lines (signal lines) for input of image data. A region surrounded by the gate lines and the source lines usually corresponds to each of the pixels.

Fringe field switching (FFS) having excellent characteristics of a viewing angle and high light transmittance has been proposed for recent liquid crystal displays (see Japanese Patent Application Laid-Open No. 2003-84303 and Japanese Patent Application Laid-Open No. 2009-133954). The FFS liquid crystal display performs display by applying a fringe electric field (oblique electric field including both components of a lateral electric field and a vertical electric field) on the liquid crystal layer. The FFS liquid crystal display includes a transparent pixel electrode and a transparent common electrode on one side of the array substrate, the transparent pixel electrode and the transparent common electrode being placed on top of each other with an insulating film therebetween. The lower-layer side is usually a plate-shaped electrode (may have a shape of a plurality of branches) while the upper-layer side is usually an electrode that is located in almost the same position as the plate-shaped lower-layer side and has a plurality of gaps serving as slits to control liquid crystals by an electric field from the side of the lower electrode through the slits. At this time, both of the pixel electrode and the common electrode can achieve high transmittance by being formed of a transparent conductive film.

Such an FFS liquid crystal display having a wide viewing angle and high transmittance has been developed for various applications. Thus, as a request placing importance on design of products, demand for a narrow frame having a smaller width around the display region has been growing.

The array substrate that includes the plurality of pixels arranged in matrix to form the display region in the liquid crystal display typically includes a dummy pixel region located around the display region, dummy pixels that imitate display pixels in the display region being arranged in the dummy pixel region (see Japanese Patent Application Laid-Open No. 1-293317 (1989)). A display portion of the display sometimes refers to a region in which the display pixels and the dummy pixels are arranged on the array substrate, but strictly speaking, the display region and the dummy pixel region are different. The reason is that there is difference between the display pixels that contribute to display with light passing therethrough and the dummy pixels that do not directly contribute to display. Thus, a light-shielding material such as a black matrix may be located on the color filter substrate facing the dummy pixels, or the dummy pixels and the display pixels may vary in conditions of driving the TFT in some cases.

The dummy pixel is manufactured so as to have the same size and the same structure as those of the display pixel in the display region in terms of appearance. Nevertheless, a structure in which a dummy pixel having a width measurement smaller than that of a display pixel has been proposed to meet the demand to narrow the width of the frame as described above (see Japanese Patent Application Laid-Open No. 9-5780 (1997)).

However, according to Japanese Patent Application Laid-Open No. 9-5780 (1997), the dummy pixel reduced in size changes a storage capacitance and a capacitance and a resistance of lines in the dummy pixel in comparison with those in the display pixel in the display region. Consequently, the dummy pixel and the pixel in the display region discontinuously vary in electrical or optical characteristics. Thus, a situation in which image quality is likely to discontinuously vary occurs in the vicinity of the dummy pixel, resulting in failures that lower display quality, such as peripheral unevenness in the display region of the liquid crystal display. Further, the reduced storage capacitance formed in the dummy pixel increases variations in potential of signal lines due to static electricity, and thus a frequent occurrence of line failures due to a short circuit between the gate lines and the source lines in the display region decreases yields.

Particularly in the FFS liquid crystal display, the fringe electric field (oblique electric field including both components of the lateral electric field and the vertical electric field) is applied to the liquid crystal layer for display. Therefore, the FFS liquid crystal display tends to be affected by variations in electric field around the display region, and the failures and the decrease in yields also have greater influences.

SUMMARY OF THE INVENTION

It is an object of the present invention to reduce a region occupied by a dummy pixel to narrow a width of a frame of a liquid crystal display panel without substantially impairing functions of the dummy pixel.

A liquid crystal display panel according to the present invention that comprises an FFS liquid crystal display panel comprises: a first substrate and a second substrate located so as to face each other; and liquid crystals sealed between the first substrate and the second substrate. The first substrate includes an insulating substrate, a plurality of gate lines located on the insulating substrate, and a plurality of source lines located so as to intersect the plurality of gate lines. A plurality of pixels partitioned by the plurality of gate lines and the plurality of source lines include a display pixel in a display region and a dummy pixel in a dummy pixel region. Each of the plurality of pixels includes a switching element located close to a position where each of the gate lines and each of the source lines intersect each other, a pixel electrode connected to the switching element, and a common electrode that is located in a layer above the pixel electrode with an insulating film between the pixel electrode and the common electrode and that drives the liquid crystals together with the pixel electrode. An area of the display pixel per one pixel is greater than an area of the dummy pixel per one pixel. The common electrode in the display pixel has a slit. A ratio of an area in which the pixel electrode and the common electrode overlap each other in the dummy pixel to an area of the pixel electrode of the dummy pixel is higher than a ratio of an area in which the pixel electrode and the common electrode overlap each other in the display pixel to an area of the pixel electrode of the display pixel.

The pixel electrode needed for forming the capacitance of the dummy pixel equal to the capacitance of the pixel in the pixel region can be reduced in size, so that the reduced dummy pixel can narrow the frame. Particularly in a case in which no slit is formed in the common electrode in the dummy pixel, there is no abnormal alignment region of the liquid crystals around the display region to reduce peripheral unevenness such as leakage of light.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a cross-sectional view of the array substrate of the liquid crystal display panel according to the second preferred embodiment;

FIG. 8 is a cross-sectional view of the array substrate of the liquid crystal display panel according to the third preferred embodiment;

FIG. 9 is a plan view of an array substrate of a liquid crystal display panel according to a fourth preferred embodiment; and FIG. 10 is a cross-sectional view of the array substrate of the liquid crystal display panel according to the fourth preferred embodiment.

DESCRIPTION OF THE PREFERRED EMBODIMENTS

<A. First Preferred Embodiment>
<A-1. Configuration>

Figure 1:
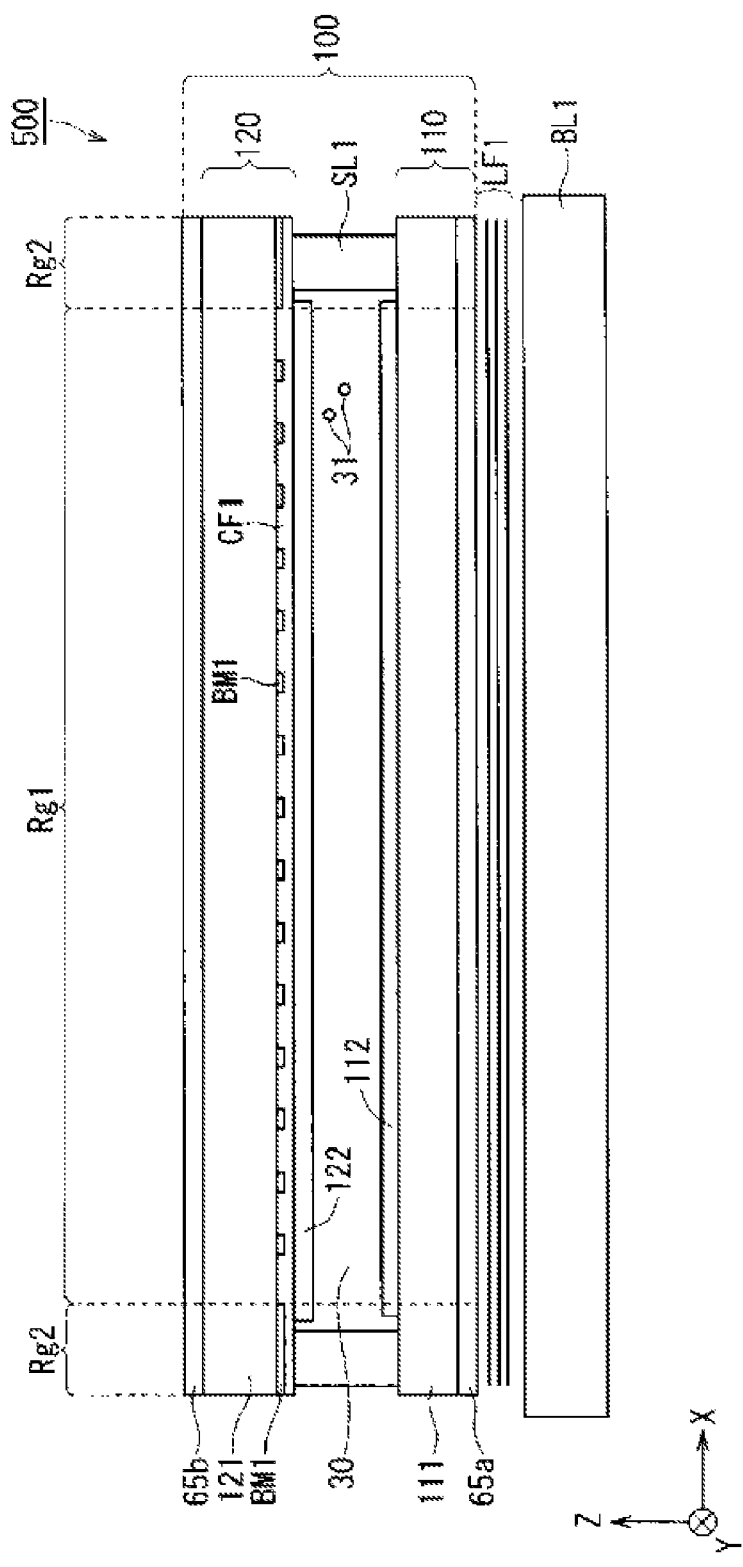
FIG. 1 is a cross-sectional view of a liquid crystal display according to a first preferred embodiment.

FIG. 1 is a cross-sectional view of a liquid crystal display 500 according to a first preferred embodiment of the present invention. The liquid crystal display 500 includes a liquid crystal display panel 100, a backlight unit BL1, and an optical film LF1. The liquid crystal display panel 100 is an FFS-mode liquid crystal display panel as described below. Hereinafter, a side of the liquid crystal display panel 100 from which a video is displayed is referred to as a visual side while a side from which the video is not displayed is referred to as a non-visual side.

The backlight unit BL1 includes a source of light such as an LED, is located on the non-visible side of the display panel 100, and emits light used for displaying the video to the display panel 100. The optical film LF1 formed of, for example, a phase difference plate is located between the liquid crystal display panel 100 and the backlight unit BL1.

The liquid crystal display 500 further includes a case (not shown). The case is made of resin or metal and accommodates structural components of the liquid crystal display 500. The structural components are, for example, the liquid crystal display panel 100, the backlight unit BL1, and the optical film LF1. The liquid crystal display panel 100 includes an array substrate 110 that is a first substrate, a color filter substrate 120 that is a second substrate and a counter substrate, and a liquid crystal layer 30. The color filter substrate 120 is the counter substrate that includes a color filter CF1 and a black matrix BM1.

The array substrate 110 and the color filter substrate 120 each have translucency. The array substrate 110 has a configuration for controlling the liquid crystal layer 30. The color filter substrate 120 is located on the visible side of the liquid crystal display panel 100 and is a substrate for emitting the light passing therethrough as colored light. The colored light is, for example, red light, green light, and blue light.

The array substrate 110 and the color filter substrate 120 are bonded to each other with a sealing material SL1. In other words, the color filter substrate 120 faces the TFT array substrate 110. A liquid crystal material is sealed between the array substrate 110 and the color filter substrate 120 to form the liquid crystal layer 30. An alignment film 112 and an alignment film 122 for aligning liquid crystal molecules 31 in the liquid crystal material are also formed between the liquid crystal layer 30 and each of the substrates. A polarizing plate 65a and a polarizing plate 65b are also formed on the array substrate 110 and the color filter substrate 120, respectively.

The liquid crystal display panel 100 includes a display portion Rg1 and a frame region Rg2 that is a peripheral region of the display portion Rg1. The display portion Rg1 is a region on which the liquid crystal display panel 100 displays the video. The display portion Rg1 includes a plurality of pixel portions (not shown) arranged in matrix, which will be described below. The liquid crystal display panel 100 displays the video by the action of electro-optics on liquid crystals in the plurality of pixel portions.

Figure 2:
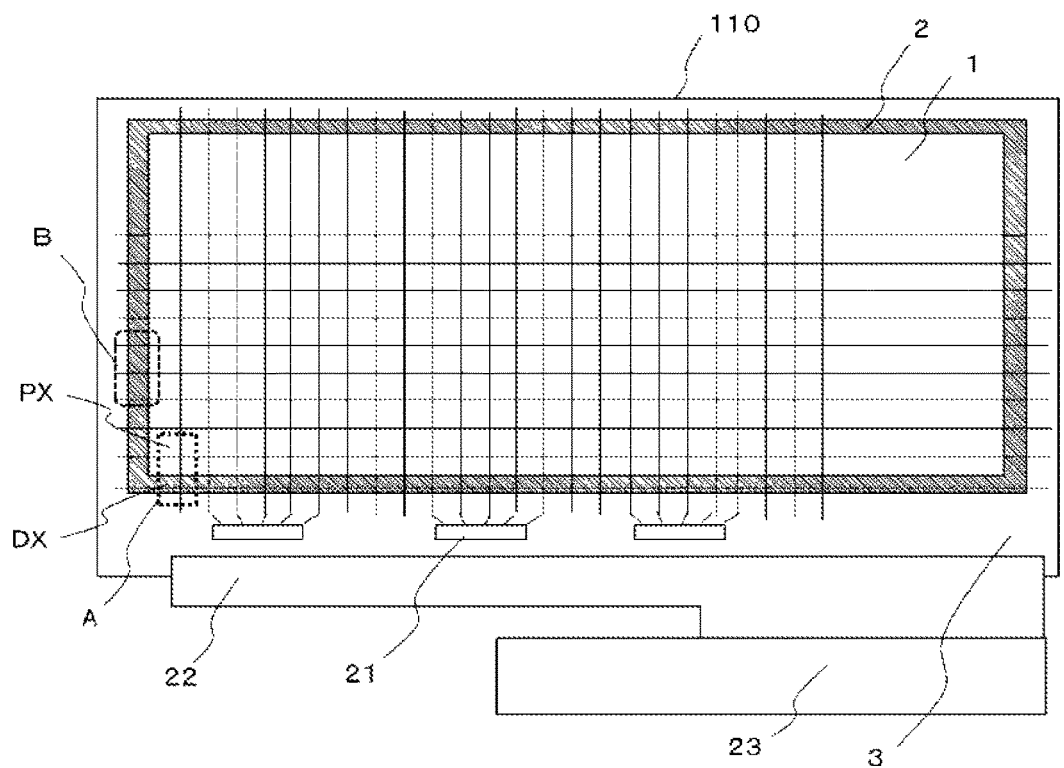
FIGS. 2 and 3 are plan views of an array substrate of a liquid crystal display panel according to the first preferred embodiment.

FIG. 2 is a plan view of the array substrate of the liquid crystal display panel according to the first preferred embodiment. While the liquid crystal display panel includes the array substrate and the color filter substrate bonded to each other as described with FIG. 1, FIG. 2 shows only the array substrate among the substrates. In other words, FIG. 2 is a top view seen when the liquid crystal display panel is placed such that the color filter substrate is located closer to the viewer or located on the top and then the color filter substrate is removed.

In FIG. 2, the array substrate 110 is divided into a display region 1, a dummy pixel region 2, and a peripheral region 3 that is a region except for the display region 1 and the dummy pixel region 2 and is located closer to the outside than the dummy pixel region 2. A plurality of gate lines that are scan lines and a plurality of source lines that are signal lines intersect each another in the display region 1, and each region partitioned by the intersections is a pixel. It is assumed that a pixel in the display region 1 is a display pixel PX while a pixel in the dummy pixel region 2 is a dummy pixel DX.

Part or all of each of the lines reaches a driver IC 21 located in the peripheral region through the dummy pixel region 2. Herein, each of the lines that is located outside the dummy pixel region 2 may be referred to as a lead-out wiring in order to be differentiated from the lines in the display region by their positions.

The driver IC 21 is mounted on the array substrate 110 through a bump. Further, for example, the driver IC 21 is electrically connected to an external driving circuit 23 through a flexible substrate 22 such as a FPC. In other words, source lines 5 and gate lines 4 in the display region 1 are electrically connected to the external driving circuit 23 through the lead-out wirings and the driver IC 21 and supplied with electric signals needed for display. Specifically, a video signal for displaying a video on the display panel 100 is applied to the source lines 5, and a scanning signal for displaying the video on the display panel 100 is sequentially applied to the gate lines 4.

Although it is not illustrated, the sealing material SL1 in FIG. 1 is located in the peripheral region 3 including the lead-out wirings or located so as to cross a boundary between the dummy pixel region and the peripheral region 3, and the color filter substrate 120 also overlaps the array substrate in a range including the vicinity of the sealing material SL1. The display portion Rg1 of the liquid crystal display panel 100 may refer to both of the display region 1 and the dummy pixel region 2 shown in FIG. 2 in some cases, but both of them are different in a light-shielding structure and a driving potential, which will be described below, and it is thus assumed that the display portion Rg1 in this preferred embodiment corresponds to the display region 1.

Figure 3:
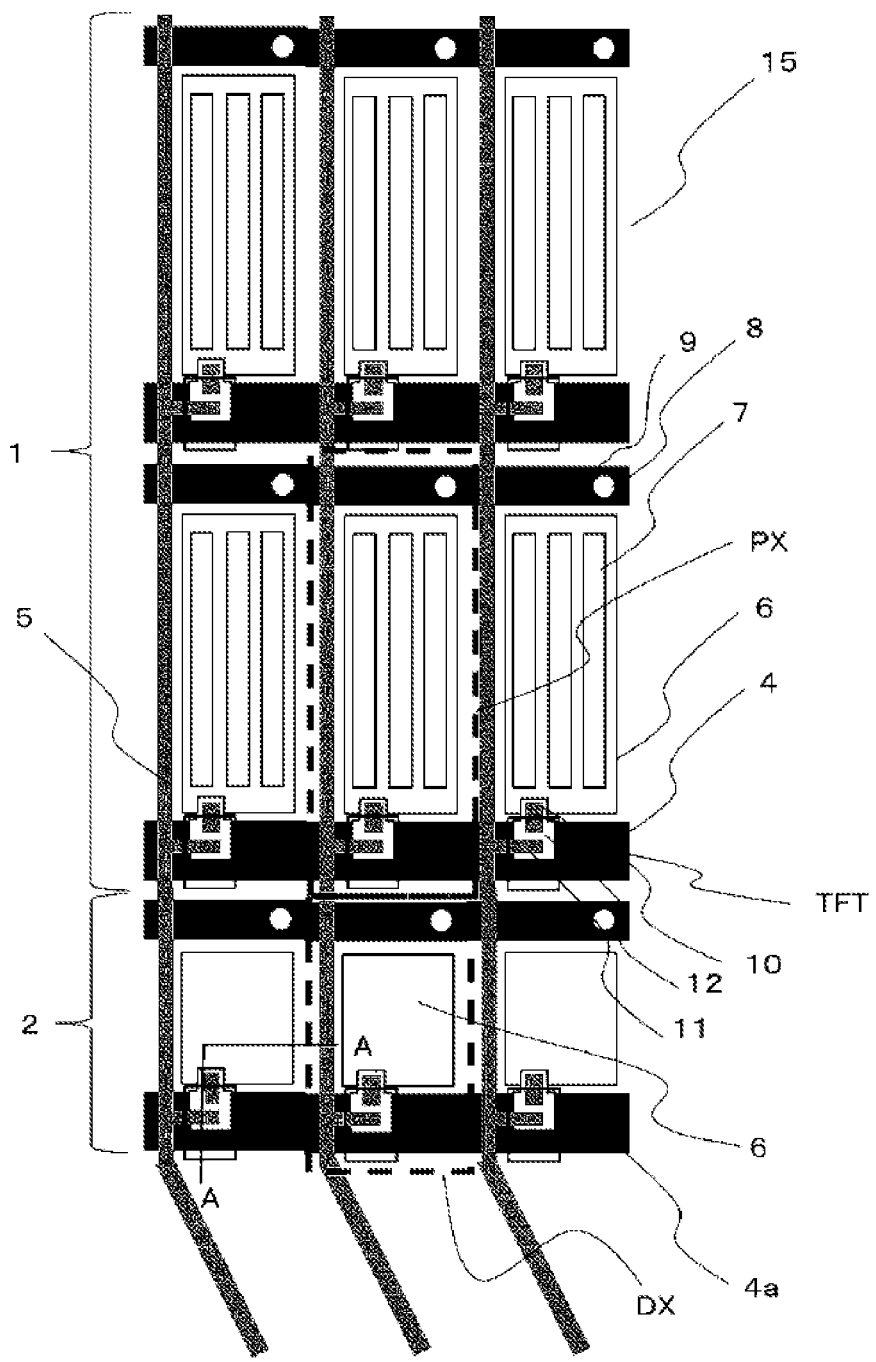
Figure 4:
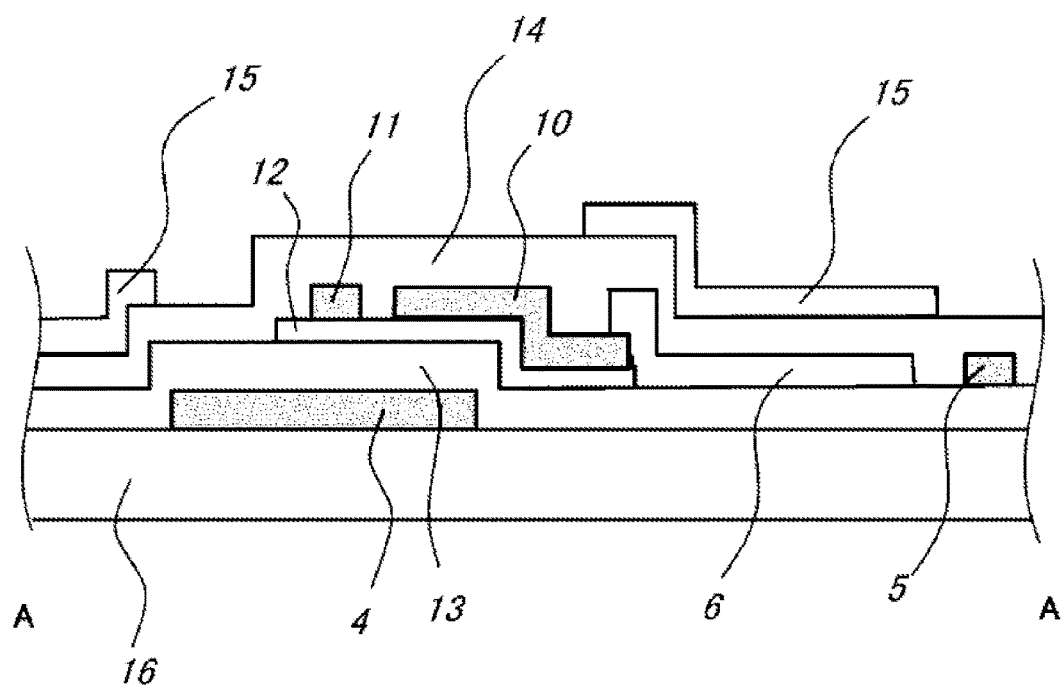
FIG. 4 is a cross-sectional view of the array substrate of the liquid crystal display panel according to the first preferred embodiment.

Next, FIG. 3 is a plan view of a region A (region surrounded by the dotted line) including the boundary between the display region 1 and the dummy pixel region 2 through which the source lines 5 pass to describe the display region and the dummy pixel region. FIG. 4 is a cross-sectional view of the array substrate 110 in a portion taken along A-A in FIG. 3.

In FIG. 3, the display pixel PX is formed so as to be partitioned by the intersections of the gate lines 4 and the source lines 5 in the display region 1. The display pixel PX corresponds to a region surrounded by the dotted line. A thin-film transistor TFT serving as a switching element and a pixel electrode 6 are formed in the display pixel PX. A structure of the thin-film transistor TFT will be described later.

The dummy pixel region 2 is formed around the display region 1 and includes the dummy pixels DX arranged along a direction in which the gate lines 4 extend. The dummy pixel DX also includes the thin-film transistor TFT and the pixel electrode 6 similarly to the display pixel PX, and is a region partitioned by the gate lines 4 and the source lines 4 and indicated by the dotted line.

Herein, the gate line 4 connected to the thin-film transistor TFT for driving the dummy pixel DX can also be referred to as a gate line located closest to the outside within the peripheral region 3, and hereinafter referred to as an outermost gate line 4a in some cases. An outermost source line 5a is similarly defined also in a region B shown in FIG. 2.

The dummy pixel DX and the display pixel PX are common in that both of them are partitioned by the lines while the dummy pixel DX, which does not directly contribute to display, in the dummy pixel region 2 may be typically differentiated from the display pixel PX in the light-shielding structure and driving conditions. For example, although it is not illustrated, a region of the color filter substrate 120 that faces the dummy pixel region 2 may include a light-shielding member such as a black matrix. Alternatively, such a voltage that always disables the thin-film transistor TFT of the dummy pixel DX may be applied to the gate line 4. For example, the electric signal applied to the gate line 4 located at the boundary between the dummy pixel region 2 and the peripheral region 3 is made different from the scanning signal applied to the gate line 4 in the display region 1, and such a voltage that always disables the thin-film transistor may be applied.

In the liquid crystal display according to the present invention, the dummy pixel DX is smaller than the display pixel PX. Moreover, the pixel electrode of the dummy pixel DX has an area smaller than an area of the pixel electrode of the display pixel PX.

Specifically, both of them have the same length in the direction in which the gate lines 4 extend while the dummy pixel DX has a shorter length in the direction in which the source lines 5 extend. In other words, a distance between the gate line 4 and the outermost gate line 4a in the dummy pixel region 2 is shorter than a distance between the gate line 4 and the adjacent gate line 4 in the display region 1.

In the liquid crystal display according to the present invention, the similar manner may also be applied to a region including the boundary between the display region 1 and the dummy pixel region 2 through which the gate lines 4 pass in FIG. 2. For the sake of understanding, part of the region in FIG. 2 is indicated as a region B (region surrounded by the dotted line). In other words, the dummy pixel DX and the display pixel PX have the same length in the direction in which the source lines 5 extend at the boundary between the display region 1 and the dummy pixel region 2 through which the gate lines 4 pass as in the region B while the dummy pixel DX has a shorter length in the direction in which the gate lines 5 extend than a length of the display pixel PX. That is to say, a distance between the source line 5 and the outermost source line 5a in the dummy pixel region 2 is shorter than a distance between the source line 5 and the adjacent source line 5 in the display region 1.

A common electrode 15 formed of a transparent conductive film is also formed so as to cover almost the entire surface of the display region 1 and the dummy pixel region 2 of the array substrate shown in FIG. 3. As described below, a dielectric insulating film is formed between the pixel electrode 6 and the common electrode 15 in each of the pixels to form a capacitance. The capacitance is also referred to as a storage capacitance, an auxiliary capacitance, and a CS capacitance, is formed between a reference potential (also referred to as a common potential) and the pixel electrode of the liquid crystal display panel, and is formed to stabilize a potential of the pixel electrode.

A CS line 9 formed as in parallel with the gate line 4 is connected to the common electrode 15 through a contact hole 8. The CS line 9 may be provided to reduce an electric resistance of the common electrode 15, but may not be necessarily formed.

The common electrode 15 has a slit 7 that is a region without part of a pattern and can be referred to as a gap, and the slit 7 is provided only in the display pixel PX. The slit 7 can represent a characteristic of the FFS, and the liquid crystal molecules of the liquid crystal layer 30 are driven by an electric field generated between the pixel electrode 6 and the common electrode 15 near the slit 7, which will be described in detail.

In the liquid crystal display panel according to the first preferred embodiment, the common electrode 15 in the dummy pixel DX does not have the slit 7. Thus, the common electrode 15 covers the entire surface of the dummy pixel DX in FIG. 2.

The capacitance between the pixel electrode 6 and the common electrode 15 in each of the pixels is proportional to an area in which both of the electrodes overlap each other. Thus, if the slit 7 is provided also in the common electrode 15 in the dummy pixel DX, a difference in capacitance between the display pixel PX and the dummy pixel DX increases according to a difference between areas of the pixel electrode, resulting in faulty display in the peripheral portion of the display region 1.

In the liquid crystal display panel according to the first preferred embodiment of the present invention, the dummy pixel DX does not have the slit 7, which is normally provided also in the dummy pixel DX. Thus, the area in which the pixel electrode 6 and the common electrode 15 overlap each other in the dummy pixel DX is increased by the dimensions of the slit, and the difference in capacitance between the display pixel PX and the dummy pixel DX as described above can be more reduced than the case in which the dummy pixel DX also has the slit 7. This can also improve the failure occurring in the peripheral portion of the display region.

In the first preferred embodiment, the manner in which the dummy pixel DX does not have the slits 7 at all as shown in FIG. 3 is described, but this is not restrictive. The area of the dummy pixel DX in which the pixel electrode 6 and the common electrode 15 overlap each other is effectively increased by reducing at least one of the length, the width, and the number of the slits 7 in comparison with the case in which the dummy pixel DX has the slit 7 corresponding to the slit 7 in the display pixel PX, and thus the effects of the invention can be achieved.

The slit 7 corresponding to the slit 7 in the display pixel PX, which is not specifically defined herein, also generates, in the dummy pixel DX, the same fringe electric field as that in the display pixel PX, for example. The assumption about the slit corresponding to the slit 7 in the display pixel PX in the manner of FIG. 3 leads to a guess such that the width and the number of the slits 7 in the dummy pixel DX are the same as those in the display pixel PX and the length of the slits 7 along the source lines 5 in the dummy pixel DX is shorter than that in the display pixel PX. In addition, the width represents a length in a short-side direction of the slit, and the length represents a length in a long-side direction of the slit.

To paraphrase this manner, it can be said that the relationship of the display pixel PX and the dummy pixel DX having the same ratio of the total area of the slits in one pixel to the area of the pixel electrode holds true. It can also be said that the dummy pixel DX has the ratio of the total area of the slits in one pixel to the area of the pixel electrode lower than the ratio in the display pixel PX in this preferred embodiment.

On the other hand, in terms of the ratio of the area in which the pixel electrode 6 and the common electrode 15 overlap each other to the area of the pixel electrode, it can also be said that the above-mentioned ratio in the dummy pixel DX is higher than the above-mentioned ratio in the display pixel PX in this preferred embodiment.

As described above, if the dummy pixel has the slit corresponding to the slit in the display pixel PX, the dummy pixel DX has the capacitance smaller than the capacitance in the display pixel PX due to the relationship in size of the area between the dummy pixel DX and the display pixel PX. However, if the total area of the slits in the dummy pixel DX is reduced by the technique for, for example, reducing at least one of the number, the length, and the width of the slits in the dummy pixel DX, the capacitance of the dummy pixel DX gets closer to the capacitance of the display pixel PX. Then, the greatest effects of the present invention can be achieved in the manner in which the dummy pixel DX and the display pixel PX have the equal capacitance.

Thus, if the area of the slit 7 in the dummy pixel DX is further reduced from the state in which the dummy pixel DX and the display pixel PX have the equal capacitance, the capacitance of the dummy pixel DX conversely exceeds the capacitance of the display pixel DX, so that it is not necessarily better to eliminate the slit 7 in the dummy pixel DX. The reason is that the intention of eliminating the slit 7 in the dummy pixel DX is to bring the capacitance of the dummy pixel DX as close to the capacitance of the display pixel PX as possible.

Even in the case in which the capacitance of the display pixel PX still remains higher than the capacitance of the dummy pixel DX when all the slits in the dummy pixel DX are eliminated as shown in FIG. 3, the effects of improving the failure such as peripheral unevenness in the display region 1 can be achieved as described above in comparison with the case in which the dummy pixel DX has the slit corresponding to the slit in the display pixel PX.

Further, the liquid crystals in the liquid crystal layer 30 in the dummy pixel DX cannot be driven by the fringe electric field without all the slits 7 in the common electrode 15 of the dummy pixel DX, which can certainly prevent the dummy pixel DX from contributing to display regardless of the electric signal applied to the gate line 4 located at the boundary between the dummy pixel region 2 and the peripheral region 3. This can eliminate the need for applying the electric signal to the gate lines and forming the light-shielding material, thereby achieving the effects of reducing the number of pins of the driver IC, kinds of driving voltages, the number of the driver ICs, and the cost due to a FPC member reduced in size.

Next, a cross section of the array substrate 110 is described with reference to FIG. 4.

A substrate having translucency, such as a glass substrate and a quartz substrate, is used for an insulating substrate 16 of the array substrate 110. The gate line 4 is located on the insulating substrate 16. The scanning signal needed for displaying the video is applied to the gate line 4 from the driving circuit. A gate insulating film 13 is located on the insulating substrate 16 that includes the gate line 4.

A channel layer 12 that is a semiconductor layer is located on the gate insulating film 13. The channel layer 12 is formed in a position opposite to part of the gate line 4 with the gate insulating film 13 between the gate line 4 and the channel layer 12, and the gate line 4 located opposite to the channel layer 12 may be referred to as a gate electrode. A source electrode 11 is formed so as to be laminated on the channel layer 12, and is branched from the source line 5. Thus, the video signal needed for displaying the video is applied to the source electrode 11 from the driving circuit 23 through the source line 5.

A drain electrode 10 is located on the channel layer 12 and over the gate insulating film 13 so as to face the source electrode 11. The pixel electrode 6 is located on the gate insulating film 13 so as to be laminated on the drain electrode 10. In this manner, the thin-film transistor TFT that includes the gate electrode, the gate insulating film 13, the source electrode 11, and the drain electrode 10 and the pixel electrode 6 electrically connected to the thin-film transistor TFT are formed. A protective film 14 is located on the gate insulating film 13, the pixel electrode 6, the channel layer 12, the source electrode 11, the drain electrode 10, and the source line 5.

The capacitance for stabilizing the pixel potential is formed between the pixel electrode 6 and the common electrode 15 that is disposed on the protective film 14 and includes the transparent conductive film. The protective film 14 also serves as the dielectric insulating film of the capacitance. In FIG. 4, the common electrode 15 is not formed on the thin-film transistor TFT, but the common electrode 15 may be formed across the entire surface including the TFT.

As shown in FIG. 3, the slit 7 for driving the liquid crystals is formed in the common electrode 15 located over the pixel electrode 6 in the display region 1. This allows the fringe electric field generated between the pixel electrode 6 and the common electrode 15 in the edge portion of the slit 7 to drive the liquid crystal molecules in the liquid crystal layer 30 for display in the FFS, and represents the characteristic of the structure in the FFS.

On the other hand, as shown in FIG. 3, the slit 7 is not formed in the common electrode 15 located over the pixel electrode 6 in the dummy pixel DX disposed in the dummy pixel region 2. This configuration can reduce the size of the pixel electrode 6 in the dummy pixel DX needed for the capacitance equal to that of the pixel in the display region 1, and thus the dummy pixel region 2 can be reduced in size, allowing for a narrow frame of the liquid crystal display panel.

The common electrode 15 in the dummy pixel region 2 does not have the slits, so that there is no abnormal alignment region of the liquid crystals around the display region 1 to reduce the occurrence of the peripheral unevenness. In other words, the FFS-mode liquid crystal display of high quality that is capable of narrowing the frame of the liquid crystal display panel and reducing the unevenness around the display region can be achieved.

The region A at the boundary between the display region 1 and the dummy pixel region 2 through which the source lines 5 pass is described with reference to FIG. 3, and the same manner can also be applied to the region at the boundary between the display region 1 and the dummy pixel region 2 through which the gate lines 4 pass, and the same effects can be achieved. In this case, a signal different from the video signal applied to the source lines 5 in the display region 1 may be applied to the source line 5 disposed at the boundary between the dummy pixel region 2 and the peripheral region 3.

<A-2. Manufacturing Steps>

Next, steps of manufacturing the array substrate 110 are described.

First, a first metal film (not shown) that is to be the gate lines 4 is formed on the insulating substrate 16. The first metal film is formed by deposition such as sputtering with DC magnetron and vapor deposition. The first metal film may be made of Mo, Cr, W, Al, Ta, Cu, or an alloy film containing one of these as a main component, and may have a thickness of 100 to 500 nm. Subsequently, patterning is performed on the film to obtain the gate lines 4, and patterning of the gate lines 4 is performed such that the dummy pixel DX in the dummy pixel region 2 has the area smaller than the area of the display pixel PX.

Next, the gate insulating film 13 is formed by deposition such as plasma CVD. Although a silicon nitride film is typically used for the gate insulating film 13, a silicon oxide film or a silicon oxide nitride film may be used, or a laminated structure of the silicon oxide film and the silicon oxide nitride film may be used. The silicon oxide film may be formed by coating such as SOG. The silicon oxide film may have a thickness of about 200 to 500 nm.

After the gate insulating film 13 is formed, an amorphous silicon film (a-Si film) is formed by plasma CVD. The a-Si film typically has a laminated structure of an intrinsic semiconductor layer forming the channel layer 12 and an impurity semiconductor layer (not shown) containing phosphorus. The impurity semiconductor layer is laminated for allowing an ohmic contact between the source electrode 11 and the drain electrode 10, which will be described below. Subsequently, patterning is performed to obtain the channel layer 12 as the a-Si film having an island-shaped pattern. When the channel layer is formed, an oxide semiconductor film such as In—Ga—Zn—O or a crystalline silicon film may be used instead of the a-Si film.

Next, a second metal film (not shown) is formed by sputtering with DC magnetron or deposition. The second metal film may be made of Mo, Cr, W, Al, Ta or an alloy film containing one of these as a main component. Subsequently, patterning is performed to obtain the source electrode 11, the drain electrode 10, and the source lines 5. When the dummy pixel region 2 that intersects the direction in which the gate lines 4 extend as shown in FIG. 2 is formed, patterning of the source lines 5 is performed such that the dummy pixel DX in the dummy pixel region 2 has the area smaller than the area of the display pixel PX.

After the above-mentioned patterning, an exposed portion of the impurity semiconductor layer to ensure the ohmic contact between the source electrode 11 and the drain electrode 10 is removed. At this time, removing may be performed by etching with the source electrode 11 and the drain electrode 10, which have already been patterned, as etching masks to reduce the number of mask processes.

After the source electrode 11, the drain electrode 10, and the source lines 5 are formed, a first transparent conductive film (not shown) that is to be the pixel electrode 6 is formed by sputtering with DC magnetron. The first transparent conductive film may be made of ITO or indium zinc oxide (IZO). The first transparent conductive film may have a thickness of about 30 to 150 nm. Subsequently, patterning is performed to obtain the transparent pixel electrode 6.

After the pixel electrode 6 is formed, the protective film 14 is formed by plasma CVD. The protective film 14 can be formed of a silicon nitride film, a silicon oxide film, a silicon oxide nitride film, or a laminated layer of the silicon nitride film, the silicon oxide film, and the silicon oxide nitride film. Alternatively, an insulating film having a flat surface may be formed by application of an organic resin film of acrylic or imide to improve insulation with the increased thickness. Further, the protective film 14 may be formed of a laminated layer of the silicon nitride film, the silicon oxide film, or the silicon oxide nitride film and the organic resin film. Subsequently, a contact hole (not shown) is formed in the protective film 14 and the gate insulating film 13 for connection to the first metal film, the second metal film, or the first transparent conductive film.

Subsequently, a second transparent conductive film (not shown) that is to be the common electrode 15 is formed. The second transparent conductive film is a conductive film having translucency for display light, and can be made of ITO or IZO for visible light. Subsequently, patterning is performed on the second transparent conductive film to obtain the common electrode 15. Herein, the slit 7 is formed in the common electrode 15 located over the pixel electrode 6 in the display region 1 while no slit is formed in the common electrode 15 in the region over the pixel electrode 6 in the dummy pixel DX in this preferred embodiment.

In addition, the manner without all the slits in the dummy pixel DX is not necessary here. As previously described, the common electrode may be formed such that the dummy pixel DX has the ratio of the area in which the pixel electrode 6 and the common electrode 15 overlap each other in one pixel to the area of the pixel electrode higher than the ratio in the display pixel PX. Thus, the slit 7 may be appropriately formed in the common electrode 15 such that the area of the dummy pixel DX in which the pixel electrode 6 and the common electrode 15 overlap each other is effectively increased by reducing at least one of the length, the width, and the number of the slits 7 in comparison with the case in which the dummy pixel DX has the slit 7 corresponding to the slit 7 in the display pixel PX.

The manufacturing steps described above can manufacture the array substrate of the liquid crystal display panel according to the first preferred embodiment. After the steps, the liquid crystal display can be manufactured by bonding the color filter substrate and the array substrate to each other with the sealing material to contain the liquid crystal layer therebetween, by subsequently mounting the driving circuit for connection to the external circuit through the FPC, and by accommodating the structural components above together with the backlight unit and the optical sheet in the case.

<B. Second Preferred Embodiment>

In the first preferred embodiment, the structure in which the pixel electrode and the source line are laminated and formed on the gate insulating film is described. In a second preferred embodiment, the present invention applied to a structure in which an insulating film is formed between the pixel electrode and the source line is described.

Figure 5:
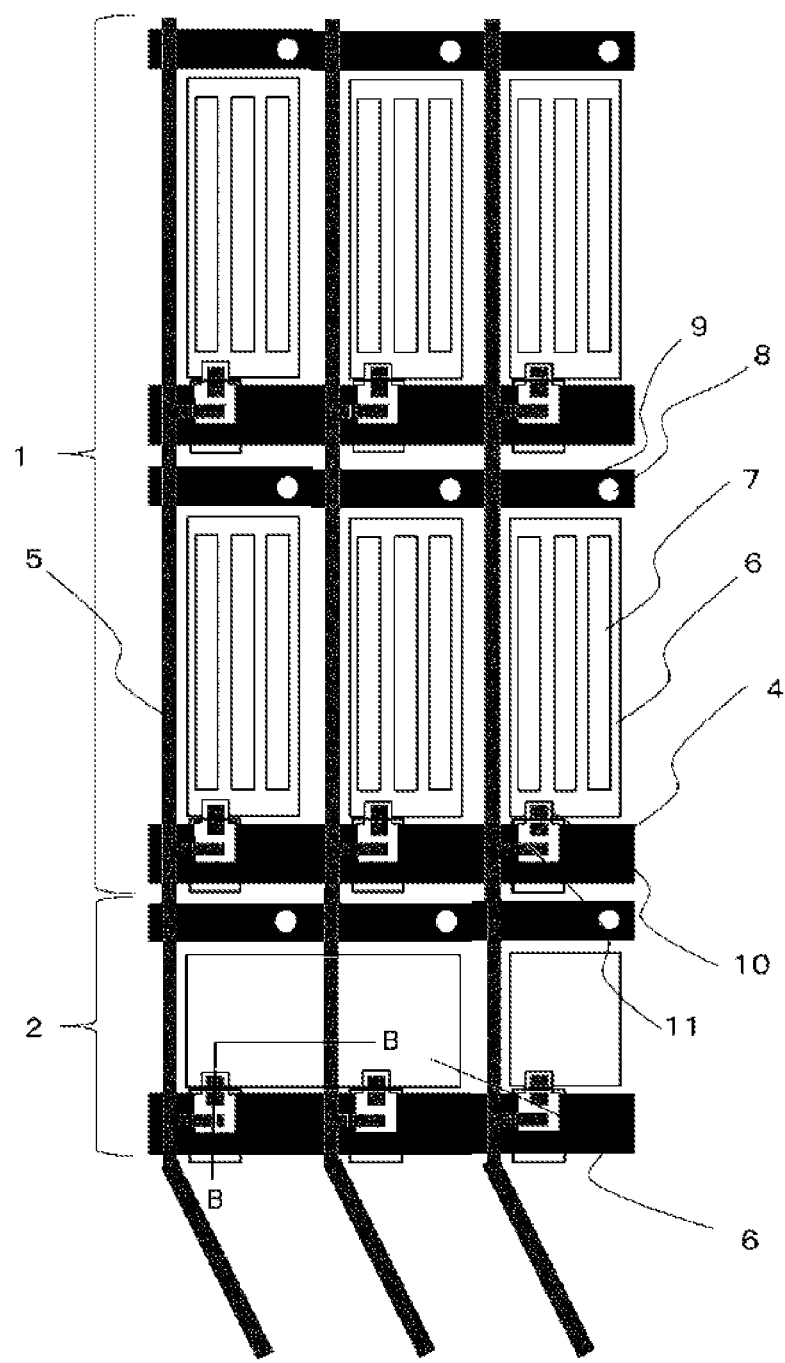
FIG. 5 is a plan view of an array substrate of a liquid crystal display panel according to a second preferred embodiment.

FIG. 5 is a plan view of an array substrate of a liquid crystal display panel according to a second preferred embodiment, and is a plan view of a region corresponding to the region A in FIG. 2. FIG. 6 is a cross-sectional view of a portion taken along B-B in FIG. 5.

As clearly seen from the comparison between FIG. 5, which is the plan view in the second preferred embodiment, and FIG. 3, which is the plan view in the first preferred embodiment, a pixel electrode 6 of the dummy pixel DX in the second preferred embodiment is formed so as to extend as one across two dummy pixels over one source line 5. FIG. 5 shows the pixel electrode 6 formed across the two pixels, but the pixel electrode 6 may be formed across three or more pixels.

The pixel electrode 6 extending as one across the plurality of pixels in a dummy pixel region 2 may be connected to each of thin-film transistors TFT in the dummy pixels. The source line 5 and the pixel electrode 6 are formed in the different layers with an insulating layer therebetween in the second preferred embodiment, and thus the source line 5 and the pixel electrode 6 are not directly laminated, which will be described later with reference to FIG. 6. For this reason, such a structure different from the first preferred embodiment is achieved.

The structure of the array substrate of the liquid crystal display panel according to the second embodiment is described with reference to FIG. 6. The thin-film transistor is the same as that in the first preferred embodiment, so that only the structure of layers located above the thin-film transistor is described.

A protective film 14 that contains silicon nitride or silicon oxide and a planarization insulating film 18 formed of an organic resin film of, for example, acrylic or imide are formed so as to cover the thin-film transistor. The pixel electrode 6 formed of a transparent conductive film is formed on the planarization insulating film 18, and the pixel electrode 6 and a drain electrode 10 are connected to each other through a contact hole 8 located in the protective film 14 and the planarization insulating film 18. With this structure, the pixel electrode 6 and the source line 5 are formed in the different layers with the insulating layer therebetween.

A capacitance insulating film 19 that contains silicon nitride or silicon oxide is formed on the pixel electrode 6, and a common electrode 15 is formed on the capacitance insulating film 19. The capacitance is formed by the common electrode 15 and the pixel electrode 6 overlapping each other in the plan view in the same manner as the first preferred embodiment. A slit 7 is formed in the common electrode 15 in the display pixel PX while the common electrode 15 in the dummy pixel DX has no slit also in the same manner as the first preferred embodiment.

The manner without the slits formed in the dummy pixel DX as shown in FIG. 5 is an example of the second preferred embodiment. The area of the dummy pixel DX in which the pixel electrode 6 and the common electrode 15 overlap each other is effectively increased by reducing at least one of the length, the width, and the number of the slits 7 in comparison with the case in which the dummy pixel DX has the slit 7 corresponding to the slit 7 in the display pixel PX also in the same manner as the first preferred embodiment.

Further, the dummy pixel DX has the ratio of the total area of the slits per one pixel to the area of the pixel electrode lower than the ratio in the display pixel PX also in the same manner as the first preferred embodiment. The relationship in size of the area in which the pixel electrode and the common electrode overlap each other is the same as that in the first preferred embodiment. Herein, "per one pixel" does not represent an area itself of the common electrode formed as one across the plurality of pixels, and represents a region partitioned by the gate lines and the source lines.

In the second preferred embodiment, the pixel electrode 6 located in each of the dummy pixels DX is formed as one by connecting the plurality of dummy pixels adjacent to each other, as already described. Herein, as also seen from FIG. 6, the pixel electrode 6 is formed on the protective film 14 and the planarization insulating film 18 and located across the source line 5 with the insulating films between the source line 5 and the pixel electrode 6. The capacitance here is formed between the pixel electrode 6 and the common electrode 15 that face each other in the thickness direction with the capacitance insulating film 19 between the pixel electrode 6 and the common electrode 15. The presence of the source line 5 separated by the planarization insulating film 18 does not affect the formation of the capacitance.

With the above-mentioned configuration, the capacitance can be formed between the pixel electrode 6 and the common electrode 15 even in the region in which the source line 5 is located, so that the dummy pixel region 2 can be further reduced in size. The source line 5 and the pixel electrode 6 are formed in the different layers, to thereby reduce failures due to a short circuit between the pixel electrode 6 and the source line 5. As a result, the FFS-mode liquid crystal display that enables the excellent display characteristics and the narrow frame can be manufactured with high yields.

In addition, according to the present invention, the preferred embodiments can be appropriately varied or omitted within the scope of the invention. Although FIG. 5 shows the region at the boundary between the display region 1 and the dummy pixel region 2 through which the source lines 5 pass, the present invention is also similarly applicable to the region at the boundary between the display region 1 and the dummy pixel region 2 through which the gate lines 4 pass.

In the region B where the gate lines 4 and the dummy pixel region 2 intersect each other, even if the drain electrode 11 and the pixel electrode 6 are directly laminated as shown in FIG. 4, the gate lines 4 and the pixel electrode 6 are formed in the different layers with the gate insulating film 13 between the gate lines 4 and the pixel electrode 6, so that the pixel electrode 6 across the plurality of dummy pixels may be provided as described in the second preferred embodiment. The structure as shown in FIG. 6 may certainly be applied to the region B.

<C. Third Preferred Embodiment>

Figure 7:
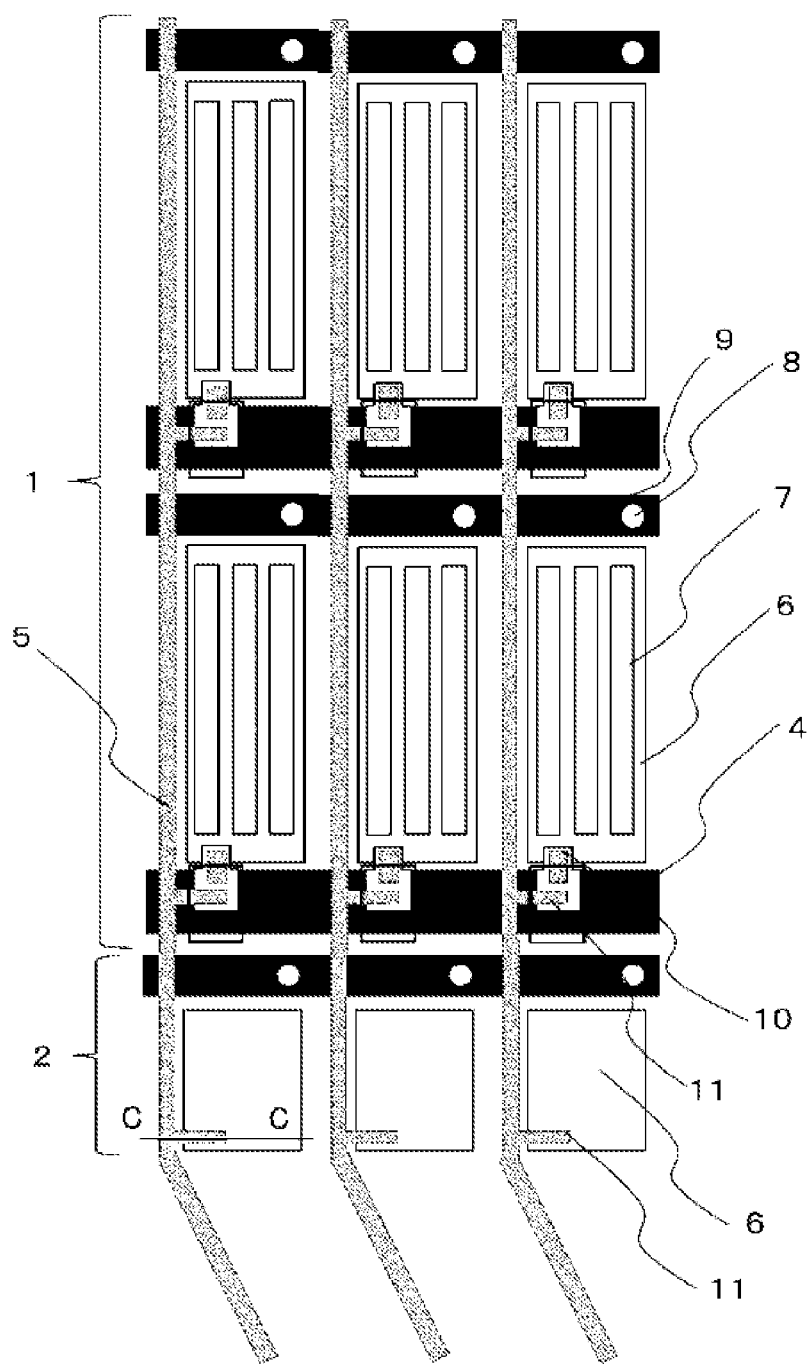
FIG. 7 is a plan view of an array substrate of a liquid crystal display panel according to a third preferred embodiment.

FIG. 7 is a plan view of an array substrate of a liquid crystal display panel according to a third preferred embodiment, and is a plan view of a region corresponding to the region A in FIG. 2. FIG. 8 is a cross-sectional view of a portion taken along C-C in FIG. 7.

Also in the third preferred embodiment, the relationship between the dummy pixel DX and the display pixel PX is the same as that in the first preferred embodiment. The thin-film transistor TFT is formed in the dummy pixel DX in the first and second preferred embodiments while the thin-film transistor TFT is not located in the dummy pixel DX in the dummy pixel region 2 of the liquid crystal display panel according to the third preferred embodiment. In other words, the drain electrode 10 and the channel layer 12 are not formed in each of the dummy pixels DX, and thus the source electrode 11 extended from the source line 5 is directly connected to the pixel electrode 6 in the third preferred embodiment.

This structure can eliminate the gate line 4 located at the boundary between the dummy pixel region 2 and the peripheral region 3, namely, the gate line 4 of the dummy pixel DX, and the dummy pixel region 2 can be further reduced in size, so that the narrower frame can be achieved.

<D. Fourth Preferred Embodiment>

FIG. 9 is a plan view of an array substrate of a liquid crystal display panel according to a fourth preferred embodiment, and is a plan view of a region corresponding to the region A in FIG. 2. FIG. 10 is a cross-sectional view of a portion taken along D-D in FIG. 9.

In the fourth preferred embodiment, a common electrode 15 located over a pixel electrode 6 in each dummy pixel DX has a slit 17 having a pitch less than or equal to half of that of the slit 7 located in the common electrode 15 in the display region 1. In other words, the slit 17 has a width less than or equal to half of that of the slit 7.

Thus, for patterning of the slit 7 in the common electrode 15 in the display region 1, a difference in etching speed between the pixel adjacent to the dummy pixel region 2 and the pixel at a distance from the dummy pixel region 2, such as the pixel in the central portion of the display region 1, can be reduced, and thus variations in dimensions of the slit 7 can be suppressed.

The capacitance has been likely to vary by variations in process dimensions due to a pixel in reduced size by high definition, causing luminance unevenness and peripheral unevenness. The structure as shown in FIGS. 9 and 10 can achieve the FFS-mode liquid crystal display that enables both of the narrow frame and the high definition.

In addition, according to the present invention, the preferred embodiments can be appropriately varied or omitted within the scope of the invention. The structure according to each of the preferred embodiments can be arbitrarily combined, or a known structure can be arbitrarily applied. For example, a staggered TFT, a top gate TFT, or a coplanar TFT may be used in place of an inverted staggered TFT. The color filter may be located on the array substrate instead of the counter substrate.

A reflective pixel electrode partially or entirely made of a material, such as aluminum and silver, that reflects visible light may be used. Particularly in a case where the pixel electrode is entirely made of the reflective material with a film containing the material that reflects the visible light as the first transparent conductive film, the array substrate does not necessarily need translucency, and the backlight on the non-visible side of the display panel can also be eliminated.

Although the manner including the dummy pixels arranged in only one row in the dummy pixel region is described, the dummy pixels may be arranged in two or more rows.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display panel that comprises an FFS liquid crystal display panel, comprising:
   a first substrate and a second substrate located so as to face each other; and
   liquid crystals sealed between said first substrate and said second substrate, wherein
   said first substrate includes
      an insulating substrate,
      a plurality of gate lines located on said insulating substrate, and
      a plurality of source lines located so as to intersect said plurality of gate lines,
   a plurality of pixels partitioned by said plurality of gate lines and said plurality of source lines include a display pixel in a display region and a dummy pixel in a dummy pixel region,
   each of said plurality of pixels includes
      a switching element located close to a position where each of said gate lines and each of said source lines intersect each other,
      a pixel electrode connected to said switching element, and
      a common electrode that is located in a layer above said pixel electrode with an insulating film between said pixel electrode and said common electrode and that drives said liquid crystals together with said pixel electrode,
   an area of said display pixel per one pixel is greater than an area of said dummy pixel per one pixel,
   said common electrode in said display pixel has a slit, and
   a ratio of an area in which said pixel electrode and said common electrode overlap each other in said dummy pixel to an area of the pixel electrode of the dummy pixel is higher than a ratio of an area in which said pixel electrode and said common electrode overlap each other in said display pixel to an area of the pixel electrode of the display pixel.

2. The liquid crystal display panel according to claim 1, wherein a distance between said plurality of gate lines in said dummy pixel region is shorter than a distance between said plurality of gate lines in said display region.

3. The liquid crystal display panel according to claim 1, wherein a distance between said plurality of source lines in said dummy pixel region is shorter than a distance between said plurality of source lines in said display region.

4. The liquid crystal display panel according to claim 1, wherein a capacitance between said pixel electrode and said common electrode in said dummy pixel is equal to a capacitance between said pixel electrode and said common electrode in said display pixel.

5. The liquid crystal display panel according to claim 1, wherein said pixel electrode is located as one across the plurality of pixels in said dummy pixel region.

6. The liquid crystal display panel according to claim 1, wherein said switching element is not located in said dummy pixel in which each of said source lines and said pixel electrode are directly connected to each other.

7. A liquid crystal display, comprising the liquid crystal display panel according to claim 1.

8. A liquid crystal display panel that comprises an FFS liquid crystal display panel, comprising:
    a first substrate and a second substrate located so as to face each other; and
    liquid crystals sealed between said first substrate and said second substrate, wherein
    said first substrate includes
        an insulating substrate,
        a plurality of gate lines located on said insulating substrate, and
        a plurality of source lines located so as to intersect said plurality of gate lines,
    a plurality of pixels partitioned by said plurality of gate lines and said plurality of source lines include a display pixel in a display region and a dummy pixel in a dummy pixel region,
    each of said plurality of pixels includes
        a switching element located close to a position where each of said gate lines and each of said source lines intersect each other,
        a pixel electrode connected to said switching element, and
        a common electrode that is located in a layer above said pixel electrode with an insulating film between said pixel electrode and said common electrode and that drives said liquid crystals together with said pixel electrode,
    an area of said display pixel per one pixel is greater than an area of said dummy pixel per one pixel, and
    said common electrode in said display pixel has a slit while said common electrode in said dummy pixel has no slit.

9. The liquid crystal display panel according to claim 8, wherein a distance between said plurality of gate lines in said dummy pixel region is shorter than a distance between said plurality of gate lines in said display region.

10. The liquid crystal display panel according to claim 8, wherein a distance between said plurality of source lines in said dummy pixel region is shorter than a distance between said plurality of source lines in said display region.

11. The liquid crystal display panel according to claim 8, wherein a capacitance between said pixel electrode and said common electrode in said dummy pixel is equal to a capacitance between said pixel electrode and said common electrode in said display pixel.

12. The liquid crystal display panel according to claim 8, wherein said pixel electrode is located as one across the plurality of pixels in said dummy pixel region.

13. The liquid crystal display panel according to claim 8, wherein said switching element is not located in said dummy pixel in which each of said source lines and said pixel electrode are directly connected to each other.

14. A liquid crystal display, comprising the liquid crystal display panel according to claim 8.

* * * * *